(12) United States Patent
Dahlberg

(10) Patent No.: US 6,202,757 B1
(45) Date of Patent: Mar. 20, 2001

(54) IMPACT MACHINE

(75) Inventor: Kurt Dahlberg, Karlskoga (SE)

(73) Assignee: Hydropulsor AB, Karlskoga (SE)

( * ) Notice: Subject to any disclaimer, the term of this patent is extended or adjusted under 35 U.S.C. 154(b) by 0 days.

(21) Appl. No.: 08/973,548

(22) PCT Filed: Jun. 21, 1995

(86) PCT No.: PCT/SE95/00758

§ 371 Date: Feb. 18, 1998

§ 102(e) Date: Feb. 18, 1998

(87) PCT Pub. No.: WO97/00751

PCT Pub. Date: Jan. 9, 1997

(51) Int. Cl.[7] ........................................................ B21J 5/00
(52) U.S. Cl. .............................. 173/1; 173/135; 173/137; 173/138
(58) Field of Search .............................. 425/87; 173/137, 173/135–138, 1; 419/66

(56) References Cited

U.S. PATENT DOCUMENTS

| 4,840,236 | * | 6/1989 | Goldman | 173/134 |
| 5,129,466 | * | 7/1992 | Bartels et al. | 173/13 |
| 5,392,865 | * | 2/1995 | Piras | 173/17 |

FOREIGN PATENT DOCUMENTS

546875  *  8/1942  (GB) .

* cited by examiner

Primary Examiner—Ngoclan Mai
(74) Attorney, Agent, or Firm—Dennison, Scheiner, Schultz & Wakeman

(57) ABSTRACT

When cutting metal rods, for instance, percussion machines are used that utilize stored kinetic energy which has been produced either mechanically or by the use of compressed gas. A drawback is the inability to accurately control the cutting process. The present invention makes use of hydraulics to control the process, thereby achieving total control of the course of the function.

19 Claims, 9 Drawing Sheets

FIG. 1
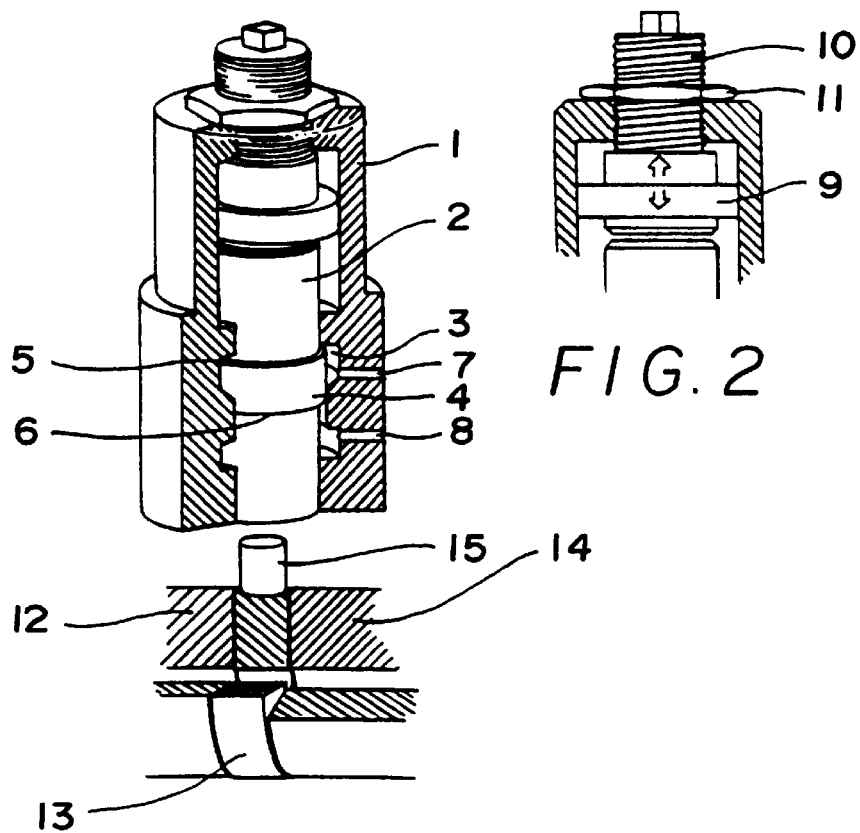
FIG. 2
FIG. 3
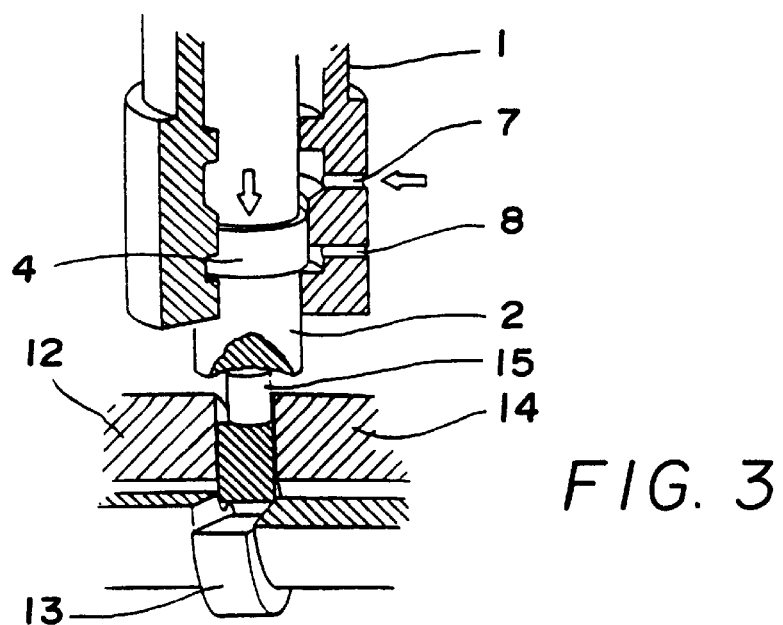

IMPACT MACHINE

The present invention relates to percussion machines. Such machines are known and feature a striking body that uses kinetic energy to strike an object. Such a striking body may, in known manner, be driven by a spring system or by means of compressed air. The supply of kinetic energy upon a stroke may be so great that the object is subjected to adiabatic coalescence which entails extremely efficient machining of the material subjected to striking. The machining occurs without loss of material and substantially avoids the occurrence of burrs, cracks or changes in the material.

When adiabatic coalescence occurs in connection with cutting, the kinetic energy transmitted should have a value of between 100 and 200 $Nm/cm^2$ cutting area. To achieve such kinetic energy the striking body should have a velocity of between 3 and 10 m/s upon impact. A percussion machine for cutting metal rods is particularly advantageous and in that case a hollow tool is used which is movable in relation to a supply hole. A percussion machine utilizing compressed air allows some 200 units/minute to be cut. On the other hand, if a spring-actuated percussion machine is used, some 400 units can be cut per minute.

The use of compressed air causes delays in the sequence control and high running costs. If a spring-actuated percussion machine is used it will be complicated and will give rise to long setting times and poor flexibility when integrating it with other machines. It is therefore desirable to develop a percussion machine with a simple running function, easy to manipulate and also easy to combine with other cooperating units.

The drawbacks mentioned above are eliminated by the present invention by changing over to utilizing hydraulics throughout. For this purpose a housing is used comprising a striking body which is moved hydraulically between two end positions. Purely hydraulically the striking body can be given such movement that, upon impact with the material encountered, it emits sufficient energy at sufficient speed for adiabatic coalescence to be achieved. The triggering stroke should be carried out quickly and a suitable time for the process is between 5 and 15 milliseconds. This short time is made possible thanks to the feasibility of removing the pressure fluid countering the stroke extremely quickly. Thanks to this rapid removal of the counter-pressing fluid, the percussion machine according to the present invention can achieve 3000 strokes/minute.

The striking body has two annular circumferential surfaces perpendicular to the axis of the body. The surface which, by means of liquid pressure, is to hold the striking body in its starting position is larger than the surface which, with the help of hydraulic pressure, is to effect a stroke movement. The pressure fluid is suitably supplied via a hydro-pneumatic accumulator.

Upon a stroke the pressure fluid that is endeavoring to keep the striking body in its initial position is emptied with the aid of a quick-acting valve system in which the movement of the body surrounding the valve is accelerated before opening the outlet valve. The opening area gradient is thus high and rapid emptying is obtained.

According to the invention two equivalent valve systems are used, constituting a valve housing comprising a cylindrical through-hole for two sealing cylinders arranged one after the other and joined by a connecting rod. Three annular recesses are also arranged one after the other, spaced from each other, the two outer annular recesses cooperating each with its own valve cylinder. All three annular grooves are connected, each by its own pipe, to a pressure fluid source.

The unit with the two pressure cylinders can assume two outermost positions. In one position one of the outer annular grooves is open position to the valve body, while the other annular groove is in closed state. One valve system is used to control the supply of pressure fluid to the impact ram, in which case its cylinders are influenced by the pressure fluid coming from the other valve system, in which it is the two outer peripheral grooves that provide the latter cylinders with pressure fluid for their displacement. The rams in the other pressure system are influenced by two electromagnets operating alternately. The electromagnets are influenced by a switch and through the function of the switch the impact rams can be caused to perform a number of strokes per time unit. The strokes may occur continually or various intervals may be inserted between strokes, thereby offering wide variation with regard to the strokes.

The percussion machine has also proved suitable for shaping components such as spheres. A tool divided into two parts is used for this purpose, the parts forming a spherical space when put together, and having a connecting tube for the supply of material such as a metal powder which has preferably been gas-atomized, and for controlling a punch to which strokes can be transmitted from the percussion machine.

According to an advantageous embodiment of the invention the striking body may be hollow and contain a second striking body, movable between the ends of the cavity. The inner striking body is influenced by means of a pressure fluid in the same manner as the surrounding impact ram. Since the impact ram consists of two units, movable in relation to each other, the nature of the stroke can be varied within wide limits. According to an advantageous embodiment the inner striking body performs a follow-up stroke in relation to the outer striking body.

It is an advantage if the striking body cooperates either directly or indirectly with a damping ram, said ram most preferably cooperating with an oil layer that achieves the damping effect.

Said damping ram may suitably be caused to cooperate with a unit for regulating the stroke length of the tool. According to the invention this is achieved by the damping ram being brought to different positions, corresponding to the desired cutting length.

Further characteristics of the invention are revealed in the appended claims.

BRIEF DESCRIPTION OF THE DRAWINGS

The present invention will be described in more detail with reference to the accompanying nine sheets of drawings in which FIG. 1 shows a housing with impact ram and tool arrangement for cutting metal rods, FIG. 2 shows an arrangement for regulating the stroke length of the impact ram, FIG. 3 shows part of an arrangement according to FIG. 1 during a stroke.

Figure 4:
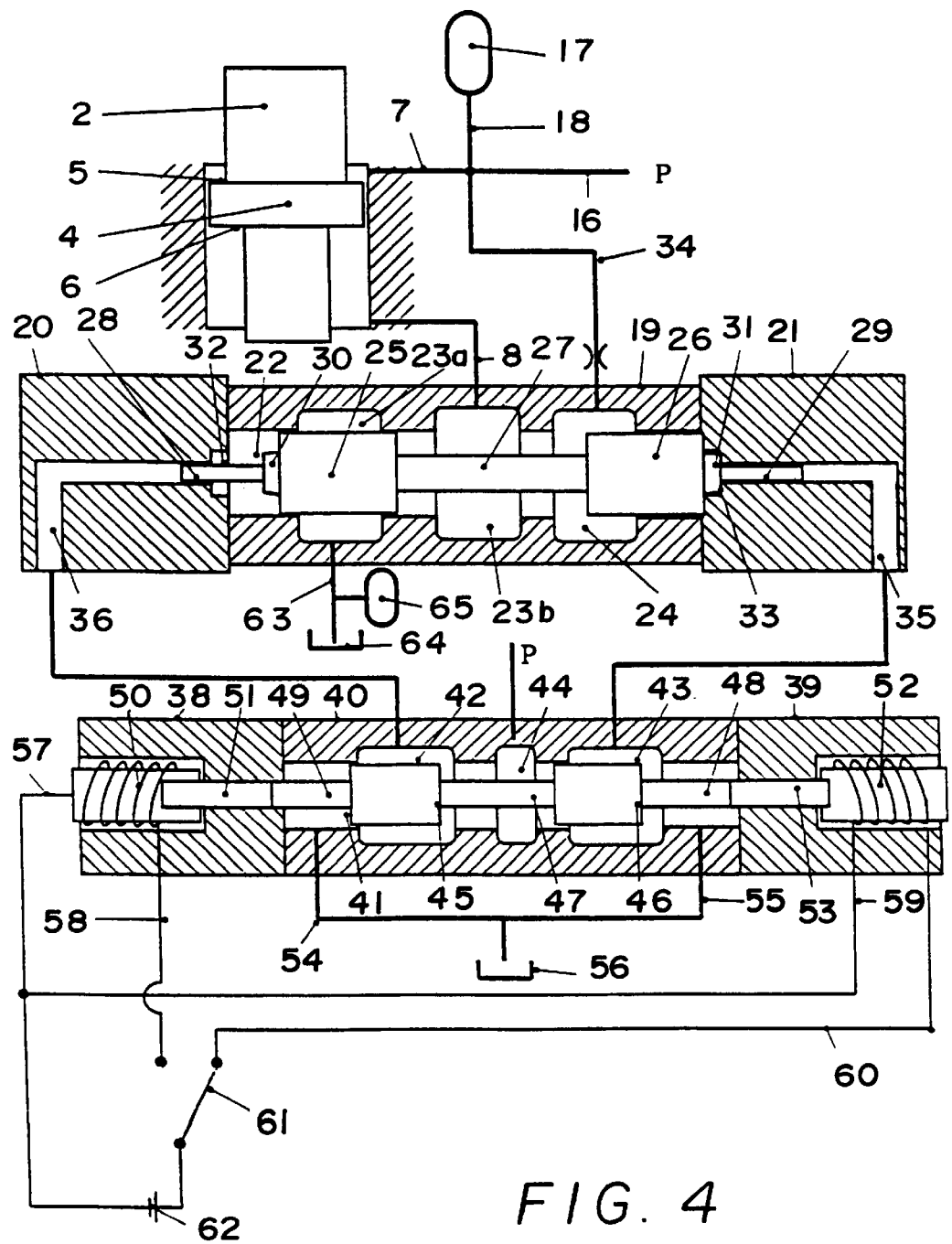
FIG. 4 shows a general diagram of a percussion machine.

In the drawings 1 is a housing containing an impact ram 2 movable between two end positions with the aid of a surrounding band 4 with two horizontal surfaces 5 and 6 designed to be influenced by a pressure fluid. 7 is an inlet for pressure fluid and 8 is both inlet and outlet for pressure fluid. Above the impact ram is a means 9 for regulating the stroke length with the aid of a vertically movable, threaded rod 10. The rod is locked in position by means of an adjustable nut 11. Said stroke-length regulator 9 may be so designed that the manual adjustment may be replaced with suitable automatic means. Below the impact ram 2 is a two-piece tool 12, 13 for rods. 12 is a fixed cutting tool, provided with a hole for rods. The cutting tool 13 is provided with a plug 15 which may be completely separate from the tool and is intended to transmit strokes from the impact ram to the movable tool 13. To the right of the tool 13 is a unit for carrying away cut metal units.

Figure 5:
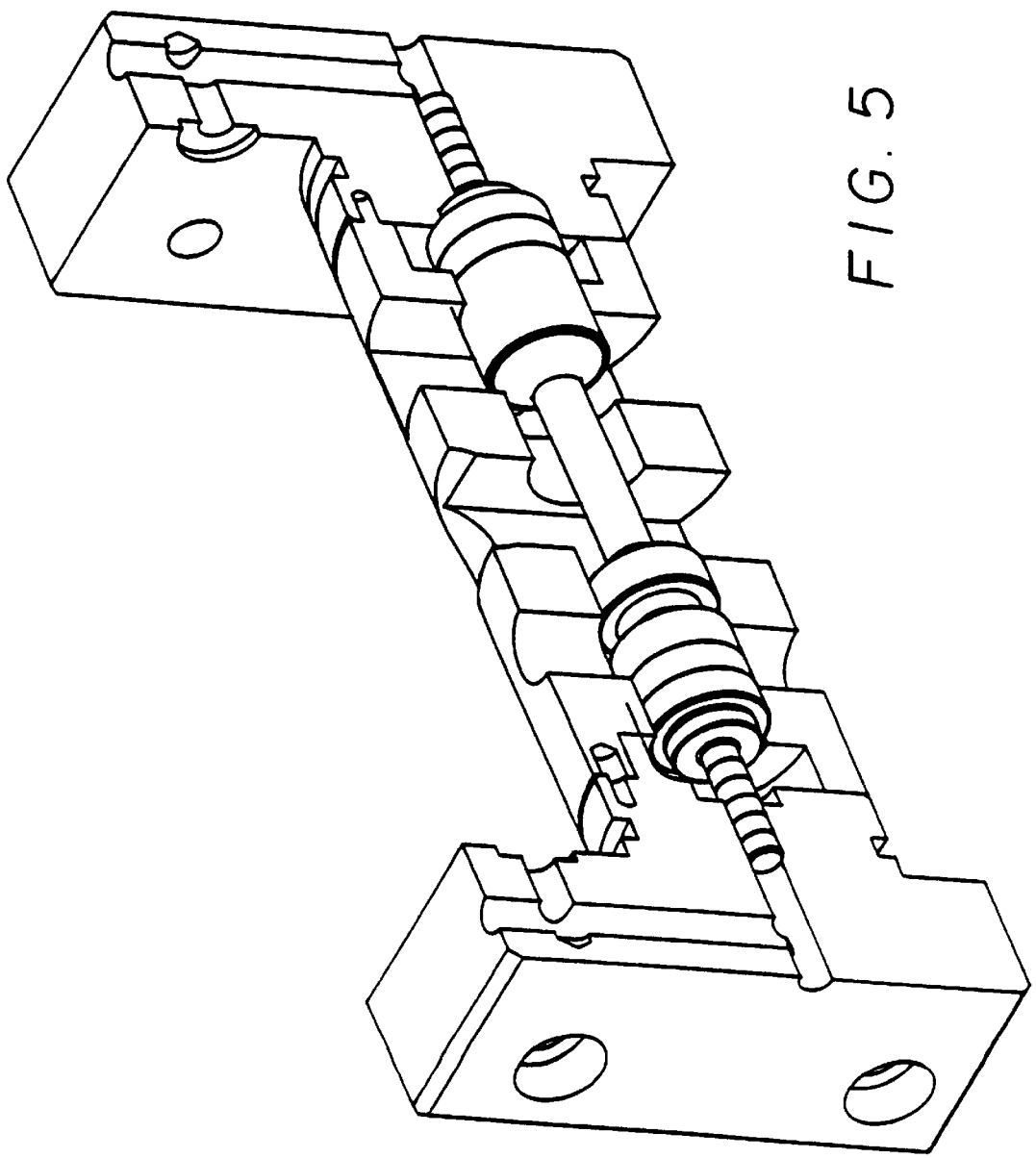
FIG. 5 shows a perspective view of a first valve system.
Figure 6:
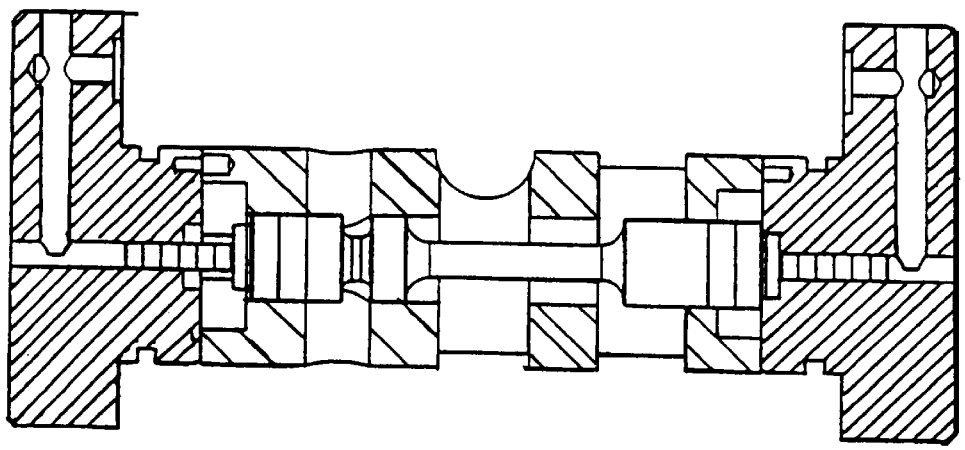
FIGS. 6–7 shows a cross section of the valve system shown in FIG. 5 in two different operating situations.
Figure 7:
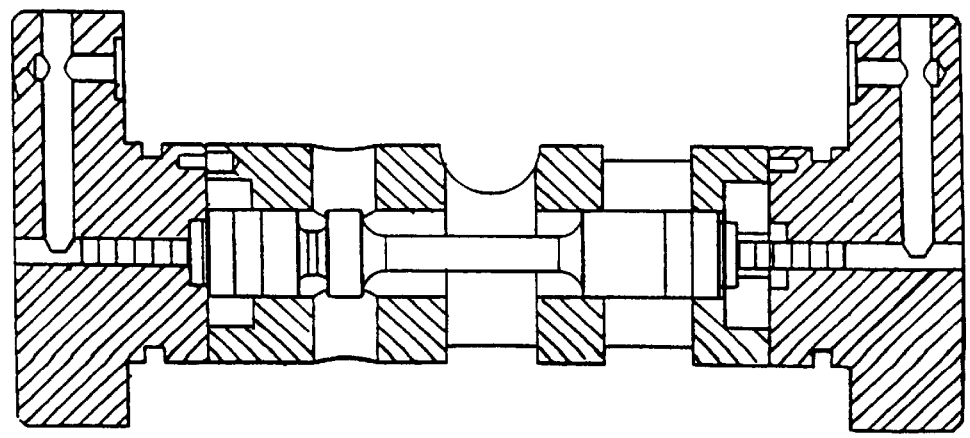
Figure 8:
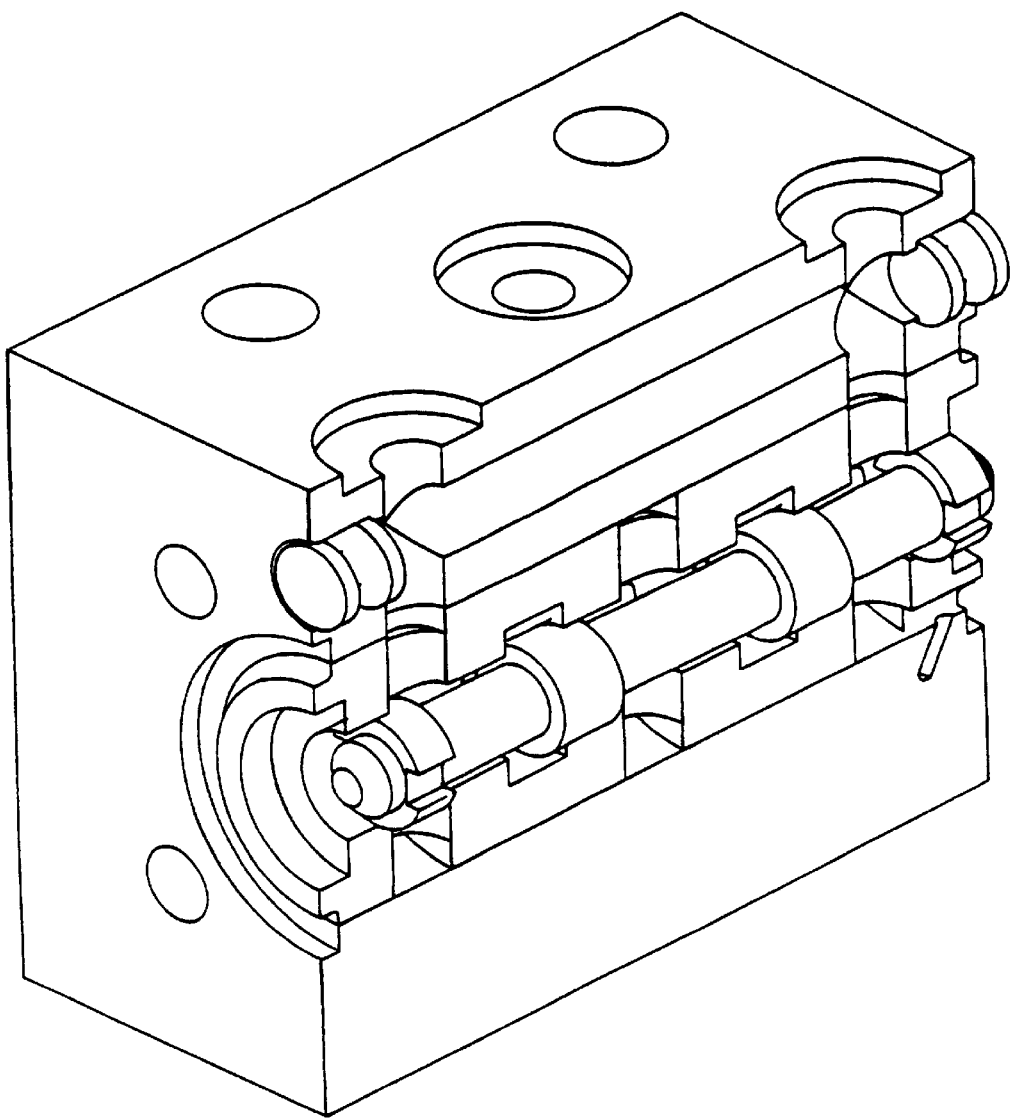
FIG. 8 shows a perspective view of a second valve system.
Figure 9:
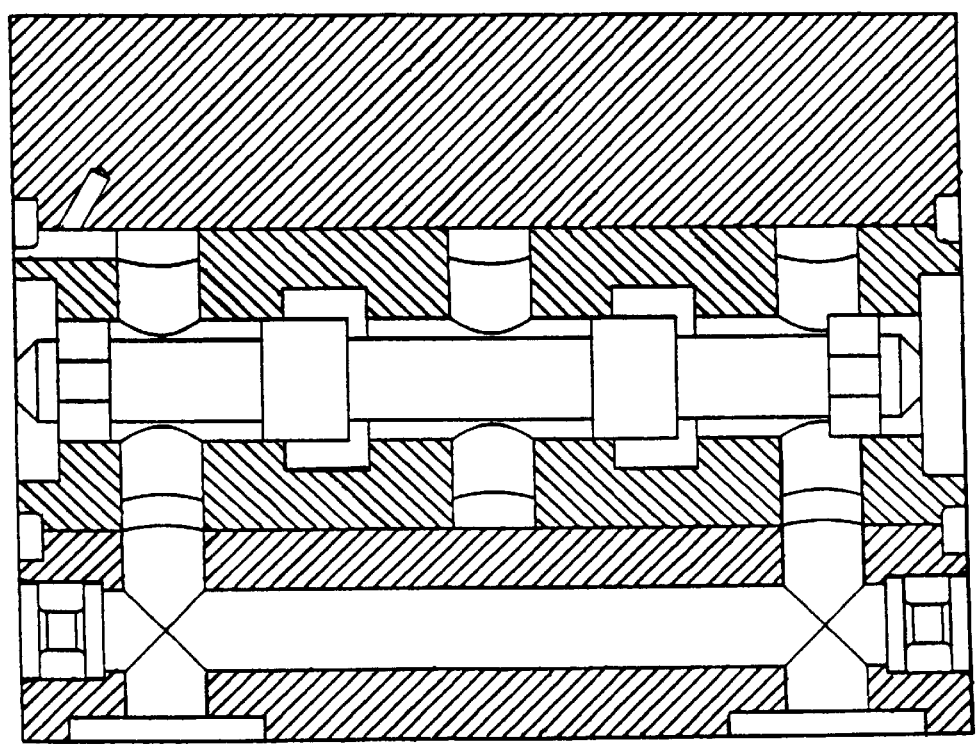
FIG. 9 shows a cross section of the valve system shown in FIG. 8 in one functioning position.

The percussion machine is supplied with pressure fluid from a pump through a pipe 16. Said pressure fluid is supplied to the housing 1 via the passage 7. The oil from the pipe 16 also communicates via the pipe 18 with a hydro-pneumatic accumulator 17. The upper contact surface 5 is thus constantly under pressure. The connection 8, communicating with the lower contact surface 6 for the pressure fluid, is connected to a first valve system consisting of a valve housing 19 with a left-hand end portion 20 and right-hand end portion 21. The valve housing 19 has a cylindrical through-hole 22 containing two valve bodies 25 and 26 arranged movable between two end positions. Both the valve bodies 25 and 26 are joined to a connection piece 27 so that the two valve bodies form a single unit. Said unit has two conically formed units 30 and 31 designed to cooperate with recesses 32 and 33. The cylindrical cavity 22 has three peripheral grooves 23a, 23b and 24. The recesses 23a and 24 have a width slightly less than the length of the valve bodies 25 and 26 with which they shall cooperate. Grooves and valve bodies shall form two valves. The space where the lower contact surface 6 is located can be connected by the connection 8 either to the groove 23a which is an outlet connection, or to the peripheral groove 24 which is under liquid pressure. The peripheral groove 23a is connected by a pipe 63 to a pressure fluid container 64 and also to a hydro-pneumatic accumulator 65. The unit with the valve bodies 25 and 26 can be moved from right to left and vice versa, and the units 30 and 31 are intended as damping means, their entry into the recesses 32 and 33 filled with pressure fluid thus having a damping effect. The units 30 and 31 are provided with rods 28 and 29 acting as rams. These are supplied with pressure fluid via the connections 35 and 36, which moves the unit with the rams 25 and 26 to either the right or the left. FIG. 5 shows a perspective view of how the system is constructed in practice. FIGS. 6 and 7 show the two operating positions the system can assume. Pressure fluid for the last-mentioned movement is obtained from a second valve system consisting of a central part 40, a left-hand part 38 with a first electromagnet 50 and a right-hand part 39 with a second electromagnetic 52, two peripheral grooves 42 and 43 and an intermediate peripheral groove 44. The peripheral grooves 42 and 43 are connected to the connections 35 and 36. The valve system also comprises two valve bodies 45 and 46 connected by an intermediate portion 47. The valve bodies 45 and 46 are provided at each end with protruding rods 48 and 49. These rods constitute contact members for movable rods 51 and 53 included in the two electromagnets 50 and 52. Voltage is supplied to the two electromagnets via wires 57, 58 and 59, 60 from a voltage source 62. The supply of voltage to the two electromagnets 50 and 52 is regulated by a switch 61. The cylindrical cavity 41 is connected via pipes 54 and 55 to a fluid container 56. FIG. 8 shows a practical embodiment of the second valve system in perspective and FIG. 9 shows said valve system in section in a working position.

Thanks to the switching member 61, the valves 45, 46, 47, 48 and 49 can move either to the right or the left. The electromagnets 50 and 52 are so chosen that they have an extremely short reaction time, lying between 2 and 3 milliseconds per stroke movement. The unit should also be made of light material such as a light metal and may be aluminium. This enables the pressure fluid supplied to the connections 35 and 36 to perform extremely rapid movements of the valve units 25, 26 and 27, so that the unit quickly opens the valve and the opening to the pressure-fluid container 64. The pressure fluid acting upwardly on the impact ram then quickly leaves the pressure surface 6 of the impact ram. This speed is also obtained since the fluid tapped off is able to escape quickly into a space formed in the peripheral groove 23a. During the tapping movement the ram unit 25, 26 and 27 will assume its left-hand position. When a stroke has been performed, the ram unit is moved to the right, whereupon the lower contact surface is again placed under pressure. After a stroke the impact ram 2 is returned to its upper position in approximately 15 milliseconds. A stroke frequency of about 3000 strokes/minute can be achieved with the present percussion machine, by allowing the switch 61 to continually change position. The switch can also be arranged so that a number of consecutive strokes is followed by an interval, and then another number of strokes and so on. The switch thus offers infinite possibilities for varying the stroke sequences. The desired kinetic energy is dependent on the oil pressure on the area of the upper contact surface 5, the weight of the striking body and of its stroke length. The energy required is determined by the material to be cut.

Figure 10:
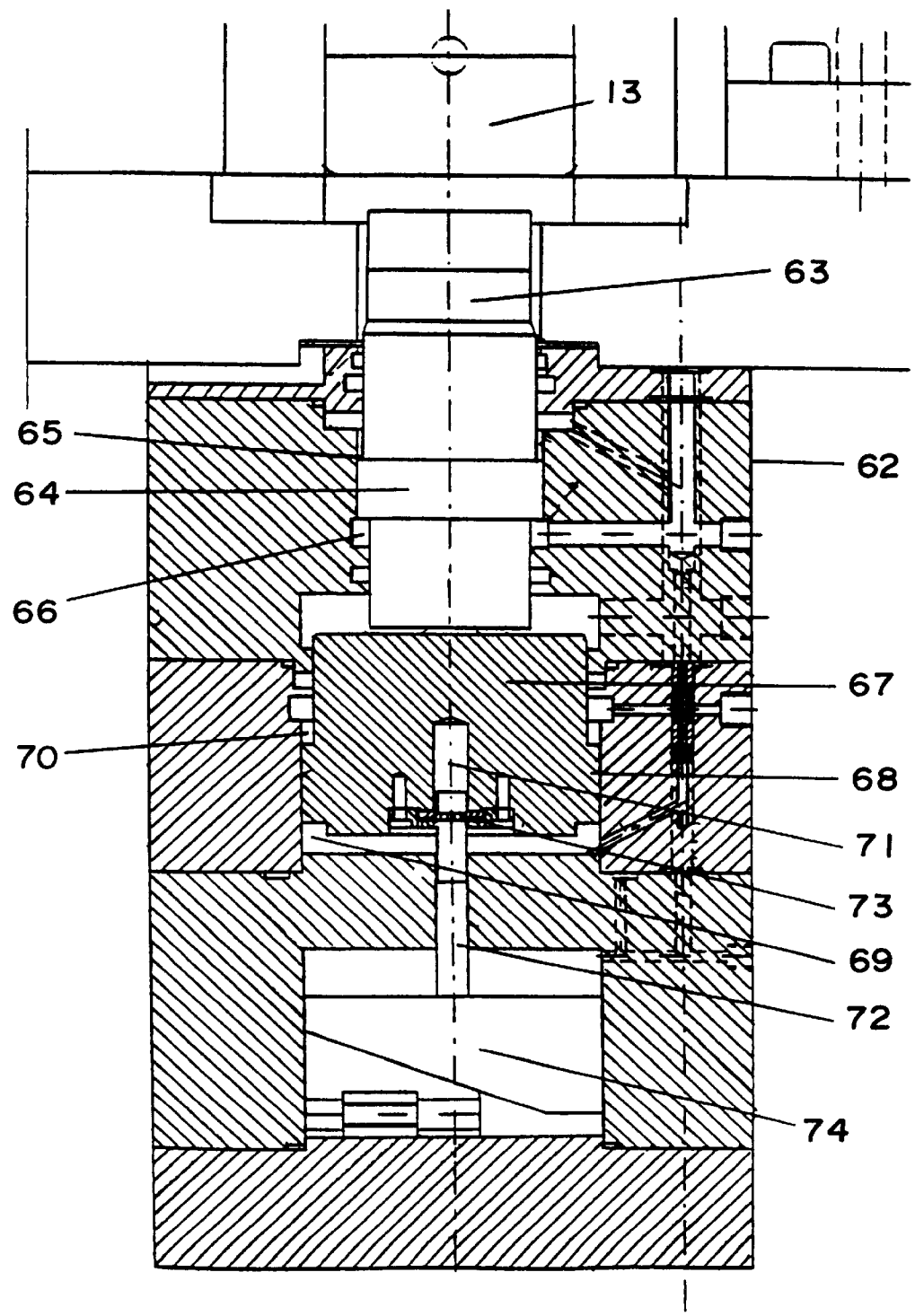
FIG. 10 shows a longitudinal section of a damping unit.
Figure 11:
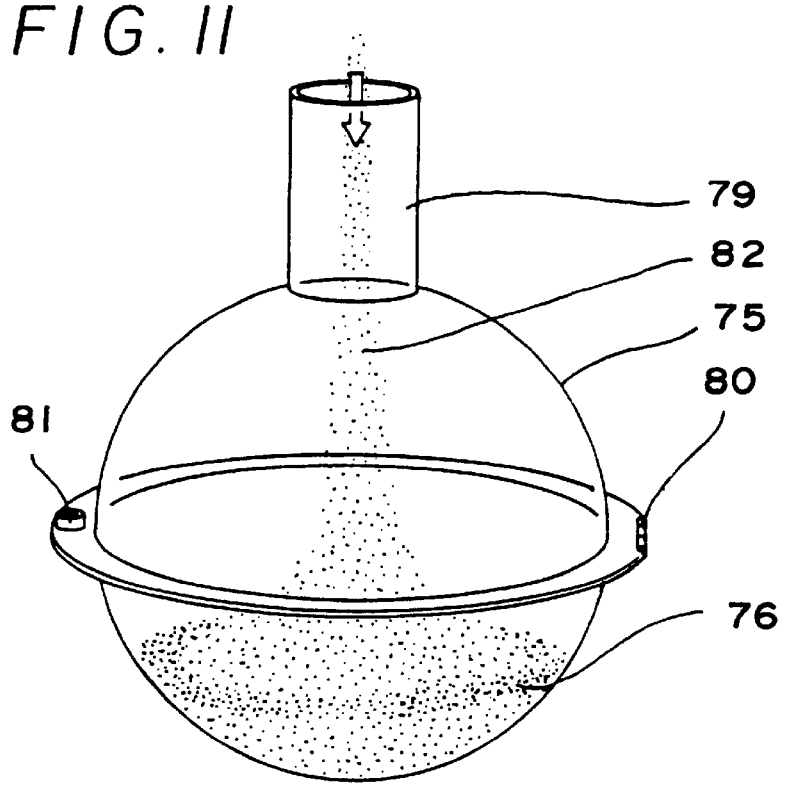
FIG. 11 shows a spherical mould for producing spherical units.
Figure 12:
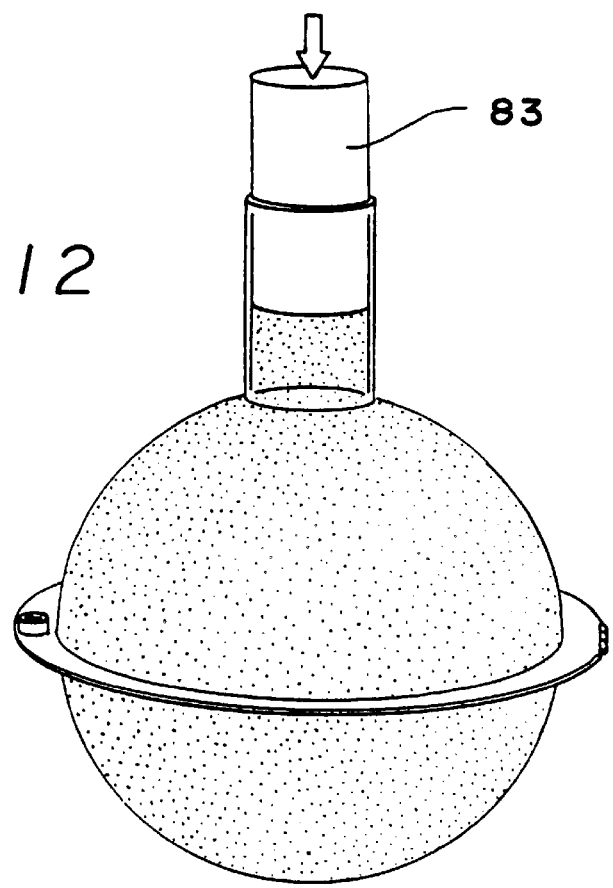
FIG. 12 shows said mould filled with material for producing a sphere and FIG. 13 shows the mould in FIG. 12 opened to reveal the sphere produced.
Figure 13:
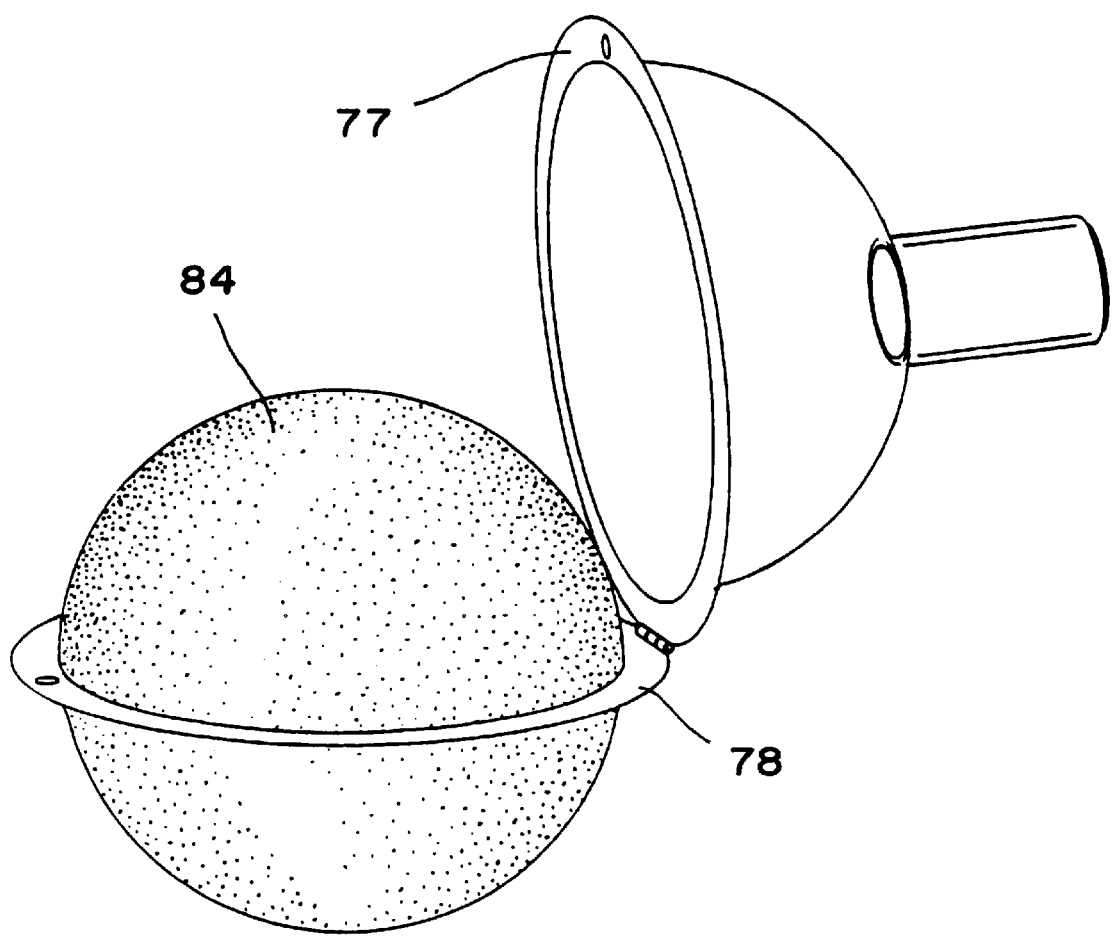

FIG. 10 shows a damping unit 62 with which the impact ram 2 can cooperate. The unit is provided with a ram 63 for returning the tool 13 which is provided with a surrounding band 64 having an upper contact surface for pressure fluid 65 and a lower contact surface 66 for pressure fluid. The transfer ram 63 cooperates with a damping ram 67 having a surrounding band 68 with an upper contact surface 70 for a pressure fluid and a lower contact surface 69 for a pressure fluid. The damping ram 67 has a central aperture 71 leading from its lower end surface. A ram 72 is arranged in this aperture in a predetermined, adjustable position. The rod is attached by its lower end to an adjustable unit 74, vertically movable to a desired position. The unit 74 may be adjusted either manually or automatically. The position of the unit 74 determines the cutting length of the tool 13. A disc 73 with a hole in it, the diameter of which allows passage of the ram 72, is secured in the lower end of the central aperture 71. The thickness of the disc is greater than the width of a peripheral groove of the ram 72, said peripheral groove having an outlet opening for pressure liquid that runs in the centre of the ram 72. The position of the damping ram 67 is fixed by the position of the peripheral groove of the ram 72. Furthermore, the actual damping effect of the damping unit is achieved by means of the oil layer appearing below the damping ram 67.

The percussion machine described has many different applications, such as as an instrument for shaping, e.g. for manufacturing spheres or other units to be manufactured in a closed moulding tool.

If spheres are to be produced, for instance, a two-part mould 75 and 76 is used which, when fitted together, defines a spherical space. The mould has a tubular part 79 through which a homogenous material 82 is poured and which is also used for control of the rod 83 inserted into the tubular part 79 and subjected to impact from the percussion machine in order to influence the material enclosed in the spherical mould. Such a mould is filled completely with material from the substance in the sphere and the tubular part. Another suitable material with which to fill the mould is metal powder and in this case, the powder inserted can be compacted the percussion machine to a density of 94–99% of the corresponding density of homogenous material. The compacting should be performed in several steps, e.g. three. If three steps or three strokes are used they must be performed extremely quickly. Each stroke has a specific function as described below:

Stroke 1 an extremely light stroke which forces out most of the air from the powder 82 and orients the powder particles to ensure that there are no great irregularities.

Stroke 2 a stroke with very high energy density and high impact velocity, for local adiabatic coalescence of the powder particles so that they are compressed against each other to extremely high density. The local temperature increase of each powder particle is dependent on the degree of deformation during the stroke.

Stroke 3 a stroke with medium-high energy and with high contact energy for final shaping of the substantially compact material body 84.

The treated body 84 obtained can then be sintered under normal atmospheric pressure.

Thanks to the two-part mould described above it is now possible to achieve compacting of spherical, gas-atomized powder, which has previously been impossible.

What is claimed is:

1. A method for producing adiabatic coalescence in a material comprising the steps of:
   providing a percussion machine with a striking unit which, when functioning, emits kinetic energy of such magnitude that metallic material can be machined with minimum changes in the material and with no material loss, and wherein the striking unit has an impact ram (2) movable between two end positions with two circumferential surfaces (5 and 6) perpendicular to the axis of the impact ram (2), which surfaces (5 and 6) can be influenced by liquid pressure and are of different sizes, the larger surface (6), when under pressure, bringing the impact ram (2) to its original position for a stroke;
   providing a metallic material at the end of a mold; and,
   driving said impact ram (2) against said material in the mold.

2. The method of claim 1 wherein the motion of the impact ram comprises a number of consecutive strokes with an interval of less than approximately 0.2 seconds between them, each stroke emitting a predetermined amount of energy.

3. A percussion machine with a striking unit which, when functioning, emits kinetic energy of such magnitude that metallic material can be machined with minimum changes in the material and with no material loss, whereby preferably adiabatic coalescence occurs, and wherein the striking unit has an impact ram (2) movable between two end positions with two circumferential surfaces (5 and 6) perpendicular to the axis of the impact ram (2), which surfaces (5 and 6) can be influenced by liquid pressure and are of different sizes, the larger surface (6), when under pressure, bringing the impact ram (2) to its original position for a stroke.

4. A percussion machine as claimed in claim 3, wherein the distance between the two end positions is adjustable.

5. A percussion machine as claimed in claim 3, wherein the kinetic energy emitted upon a stroke is dependent on the liquid pressure acting on the smaller circumferential surfaces (5), the impact ram mass (2) and the stroke length, and has a value set for predetermined machining.

6. A percussion machine as claimed in claim 3, wherein the liquid pressure is supplied to the smaller circumferential surface (5) via a hydro-pneumatic accumulator (17).

7. A percussion machine as claimed in claim 3, wherein the pressure on the smaller circumferential surface (5) is exerted continuously.

8. A percussion machine according to claim 3 wherein the space where the pressure acting on the larger circumferential surface (6) is built up is provided with an outlet and an inlet regulated by a valve system comprising a first valve member (25) and a second valve member (26) and wherein valve member (26) is movable and is accelerated by a pressure fluid (29) a first distance before said valve system opens.

9. A percussion machine as claimed in claim 7, wherein a recess (23a) is provided for receiving pressure fluid (29) after valve member 25 has traveled said first distance.

10. A percussion machine as claimed in claim 3, wherein that the impact ram (2) is hollow and contains a second impact ram that can be influenced by pressure fluid, preferably in the same manner as the surrounding ram, the second ram influencing the striking function of the hollow ram by means, of a supplementary stroke.

11. A percussion machine as claimed in claim 8 characterized in that said valve system comprises a valve housing having a cylindrical thorough-hole (22) and a valve system comprising two valve bodies (25 and 26) arranged one after the other in the hole (22) and joined by a connecting rod (27), three annular recesses arranged one after the other, spaced from each other and perpendicular to the hole (22), said recesses (23a, 23b, and 24) preferably having quadratic cross section and communicating with a pressure medium, the two outer grooves (23a and 24) being designed to form valves with the two valve bodies.

12. A percussion machine as claimed in claim 11 characterized in that the length of at least one valve body (25) is considerably greater than the width of the cooperating recess (23a).

13. A percussion machine as claimed in claim 11 characterized by means comprising fluid or electromagnets (50 and 52) to displace the valve bodies (25 and 26).

14. A percussion machine as claimed in claim 11 characterized in that the valve system is manufactured out of material in order to achieve fast displacement.

15. A percussion machine as claimed in claim 3 including a damping means having a transmitting ram (63) for transmitting strokes from said impact ram (2) to a damping ram (67), said transmitting ram (63) and said damping ram (67) being influenced by pressure fluid in the same way as said impact ram (2).

16. A percussion machine as claimed in claim 15 characterized by an adjusting unit (74) for influencing machine stroke length by adjustment of the damping ram (67).

17. A percussion machine as claimed in claim 16 characterized by a damping ram (63) for adjusting the hydraulic valve (72 and 73).

18. A percussion machine as claimed 17 characterized by a disc with a central aperture, arranged at the lower end of the damping ram (67), into which aperture an adjustable ram is inserted, having a peripheral groove with an outlet for pressure fluid, said outlet running in the longitudinal direction of the adjustable ram.

19. A percussion machine as claimed in claim 3 including a tool characterized by halves (75 and 76) which, when combined, form an enclosed cavity, preferably spherical, which cavity is connected to a pipe (79) acting as filling pipe for preferably gas-atomized metal powder (82) and also as a control pipe for a rod or ram (83) which is to transmit strokes from the impact ram (2).

* * * * *